UNITED STATES PATENT OFFICE.

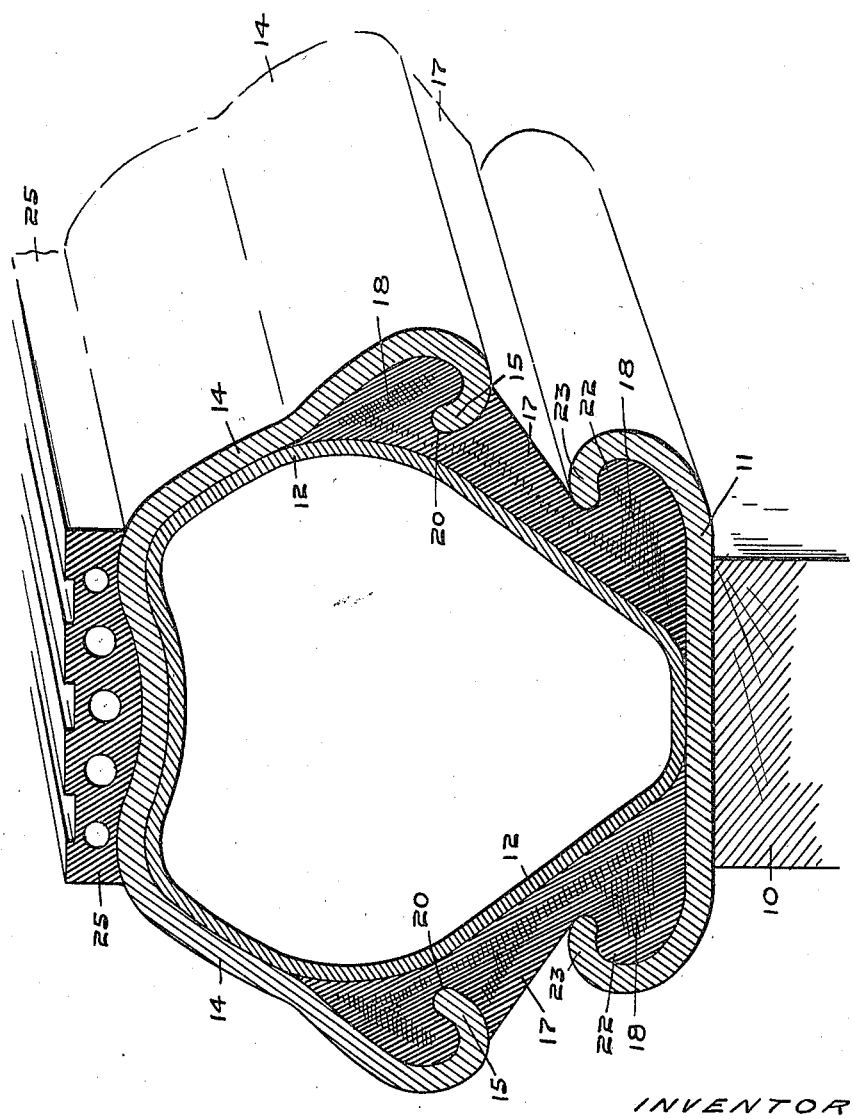

JOHN A. JOHNSON, OF GREENFIELD, INDIANA, ASSIGNOR, BY DIRECT AND MESNE ASSIGNMENTS, TO J. W. P. TIRE COMPANY, OF INDIANAPOLIS, INDIANA, A CORPORATION OF DELAWARE.

PNEUMATIC TIRE.

1,326,154.   Specification of Letters Patent.   Patented Dec. 23, 1919.

Application filed April 14, 1916. Serial No. 91,147.

*To all whom it may concern:*

Be it known that I, JOHN A. JOHNSON, a citizen of the United States, residing at Greenfield, in the county of Hancock and State of Indiana, have invented certain new and useful Improvements in Pneumatic Tires, of which the following is a specification.

This invention relates to pneumatic and similar tires employed on motor and like vehicles; and one of the objects of the present invention consists in forming the crown-member of the casing of practically non-puncturable material, for resisting punctures, while the remaining portion of the casing is made up of suitable resilient material, for preserving the necessary resiliency of the tire.

A further object of the invention consists in forming the non-puncturable crown-member with circumferentially extending bends or corrugations, so that the yielding of the metal, incident to the diametrical changes of the tire under stress, will be distributed across the whole crown-member instead of being localized along the center of the crown, as obtains in smooth surfaced casings.

A still further object of the invention consists in providing a non-puncturable crown-member for tire casings with clencher flanges, the remaining portion of the casing being composed of resilient members having grooves for receiving the flanges, the said resilient members providing the resiliency of the tire and for more tightly impinging and further overlapping the flanges when the tire is under stress, thereby reducing the possibility of foreign matter entering between the parts.

A further object of the invention consists in the provision of tires of the above character which will be simple in construction, efficient and cheap to manufacture.

I accomplish the objects of the invention by means of the construction illustrated in the accompanying drawings, forming a part hereof, in which—

The figure is a fragmentary detail cross section in perspective, showing the construction and arrangement of my improved pneumatic tire.

Referring to the drawings, 10 represents the usual wood wheel felly, and 11 a conventional style of clencher rim for pneumatic tires in general use. 12 represents the inner tube which provides the air chamber for the tire.

The outer casing of the tire, in the present case, comprises in part a thin metallic strip 14 which forms the crown and a portion of the sides of said casing. The metal strip 14 is preferably composed of sheet steel for lightness and strength, and the side edges of said strip are bent to form inwardly projecting clencher flanges 15. The strip 14 is slightly bent inward circumferentially along its crown, thereby destroying a uniform self supporting structure as obtains in a structure formed in a true concentric arc in cross section, which construction permits perceptible lateral yielding which is incident to diametral changes of the casing when under stress. That is to say, sudden impulses exerted upon the casing causes the metal in strip 14 to yield laterally and coincidently changes its transverse diameter momentarily. In practice, when using a smooth surfaced metal strip, it has been found that the constant lateral spreading and contraction of the resilient strip caused it to rapidly crystallize and break down along a line extending circumferentially through the center of the crown, before two thousand miles of travel had been recorded, due to the fact that all lines of force transmitted through the uniformly and evenly shaped strip were localized at the center of the crown, thereby inducing early breaking down of the metal at this point. After substituting strip 14, shaped approximately as shown in the drawings, with its surface broken up by numerous lines along which the metal may bend, thereby destroying the uniform continuity of the arc, a great increase of mileage could be secured without apparent change in the physical character of strip 14. As will be observed, the metal strip 14 forms the major portion of the outer casing, and the remaining portion of the outer casing comprises two annularly extending similarly formed members 17 which are composed of rubber having the usual fabric 18 embedded therein, as obtains in the usual construction of pneumatic tire casings. The members 17 are centrally provided with annularly extending grooves 20 adapted to receive the free edges of the clencher flanges formed by bending the edges of the metal strip 14, which in effect forms a clencher connection at these points, between the strip 14 and members 17. The members 17 are formed so that, first, their exterior edges lying along grooves 20 will lap over approximately to the center of the crown of the flanges 15, thereby excluding foreign matter from between the parts: and, second, said members being formed along grooves 20 so that in expanding under stress the flanges 15 will more fully be overlapped and more tightly impinged. Along the exterior base edges the members 17 are provided with the usual clenchers 22 which engage the clencher flanges 23 formed by bending the side edges of rim 11. With the above construction in mind, it will be noted that while the metal strip forms a shield for protecting the inner tube 12 against the introduction of foreign substances, it also reduces the cost of manufacture through the elimination of a large amount of rubber, and members 17, which are composed of rubber, provide not only the necessary resiliency for the tire, but additionally the means for mounting and for the attaching of the strip 14 with the rim 11.

Running circumferentially along the crown of the strip 14 is a suitable tread 25, of rubber or similar material, which comes into direct contact with the ground and reduces the liability of skidding.

While I have described my invention with more or less minuteness as regards details of construction and arrangement and as being embodied in certain precise forms, I do not desire to be limited thereto unduly or any more than is pointed out in the claims. On the contrary, I contemplate all proper changes in form, construction and arrangement, the omission of immaterial elements, and the substitution of equivalents as circumstances may suggest or necessity render expedient.

I claim:

1. The combination with a wheel-rim and its marginal clencher flanges, of a tire casing comprising in part a yieldable metal strip forming the tread and a portion of the sides of said casing, clencher flanges formed on the free edges of said strip, resilient members completing the sides of the casing, said resilient members each having a pair of annular channels for receiving the clencher flanges on both the strip and wheel-rim and having an increasing thickness from their inner to their outer channels for increasing their load carrying properties.

2. The combination with a wheel-rim and its marginal clencher flanges, of a casing comprising in part a circumferentially extending channeled metal strip forming the tread and a portion of the sides of said casing, clencher flanges formed on the edges of said side portions of the strip, flexible members forming the remaining portion of the casing and having circumferentially extending grooves near their centers for receiving the clencher flanges carried by said metal strip, and outwardly projecting beads formed along the lower and outer edges of the flexible members of the casing for engaging the channels formed by the adjacent clencher flanges on the wheel-rim.

In witness whereof, I have hereunto set my hand and seal at Indianapolis, Indiana, this 31st day of March, A. D. one thousand nine hundred and sixteen.

JOHN A. JOHNSON. [L. S.]